United States Patent
Yamagishi et al.

(10) Patent No.: US 8,823,240 B2
(45) Date of Patent: Sep. 2, 2014

(54) STATOR AND ROTATING ELECTRICAL MACHINE

(71) Applicant: Kabushiki Kaisha Yaskawa Denki, Kitakyushu (JP)

(72) Inventors: Toshiyuki Yamagishi, Kitakyushu (JP); Takenori Oka, Kitakyushu (JP); Toyofumi Yuda, Kitakyushu (JP)

(73) Assignee: Kabushiki Kaisha Yaskawa Denki, Kitakyushu-Shi (JP)

( * ) Notice: Subject to any disclaimer, the term of this patent is extended or adjusted under 35 U.S.C. 154(b) by 0 days.

(21) Appl. No.: 13/792,198

(22) Filed: Mar. 11, 2013

(65) Prior Publication Data
US 2014/0077655 A1 Mar. 20, 2014

(30) Foreign Application Priority Data
Sep. 19, 2012 (JP) ................ 2012-205649

(51) Int. Cl.
*H02K 15/02* (2006.01)
*H02K 3/32* (2006.01)
*H02K 1/14* (2006.01)
*H02K 1/18* (2006.01)

(52) U.S. Cl.
CPC ............ *H02K 3/32* (2013.01); *H02K 1/148* (2013.01); *H02K 2203/12* (2013.01); *H02K 1/185* (2013.01)
USPC .................................. 310/216.101

(58) Field of Classification Search
USPC ........... 310/215, 216.099, 216.101, 216.102, 310/194
See application file for complete search history.

(56) References Cited

U.S. PATENT DOCUMENTS

| | | | |
|---|---|---|---|
| 6,304,018 B1 * | 10/2001 | Ham et al. | 310/216.048 |
| 6,674,211 B2 * | 1/2004 | Katou et al. | 310/215 |
| 6,984,911 B2 * | 1/2006 | Horie et al. | 310/194 |

FOREIGN PATENT DOCUMENTS

| | | |
|---|---|---|
| JP | 11-150900 | 6/1999 |
| JP | 2002-58181 | 2/2002 |
| JP | 2004-072824 | 3/2004 |
| JP | 2011-83192 | 4/2011 |

OTHER PUBLICATIONS

Japanese Office Action for corresponding JP Application No. 2012-205649, Jun. 18, 2013.

* cited by examiner

*Primary Examiner* — Dang Le
(74) *Attorney, Agent, or Firm* — Mori & Ward, LLP (57) ABSTRACT

A stator includes: a stator core having an almost annular outer core and an inner core arranged inside the outer core; and a bobbin having a cylindrical body part around which a winding wire is wound and a flange part that is formed so as to rise up from the cylindrical body part, with a plurality of bent parts and an edge part.

17 Claims, 6 Drawing Sheets

STATOR AND ROTATING ELECTRICAL MACHINE

CROSS-REFERENCE TO RELATED APPLICATIONS

The present application claims priority under 35 U.S.C. §119 to Japanese Patent Application No. 2012-205649, filed Sep. 19, 2012. The contents of this application are incorporated herein by reference in their entirety.

BACKGROUND ART

Field of the Invention

The present invention relates to stator and rotating electrical machine.

Conventionally, a stator used for a rotating electrical machine such as an electrical motor is provided with a plurality of teeth. In the plurality of teeth, a bobbin around which winding wires are wound is respectively inserted. Increasing the frequency of turns of the winding wires around the bobbins (also referred to as the number of winding wires or the number of turns) increases the space factor, that contributes to improvement in the property of the rotating electrical machine. For example, the improvement in space factor by superposing two coils wound in reverse directions by a covered wire having a square cross-section to form a set is suggested (for example, refer to Japanese Unexamined Patent Application Publication No. 2004-72824).

SUMMARY OF THE INVENTION

Problem to be Solved by the Invention

A stator includes: a stator core having an almost annular outer core and an inner core arranged inside the outer core; and a bobbin having a cylindrical body part around which winding wires are wound and a flange part that is formed so as to rise up from the cylindrical body part, with a plurality of bent parts and free end parts.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings.

DESCRIPTION OF THE EMBODIMENTS

The embodiments will now be described with reference to the accompanying drawings, wherein like reference numerals designate corresponding or identical elements throughout the various drawings.

Figure 1:
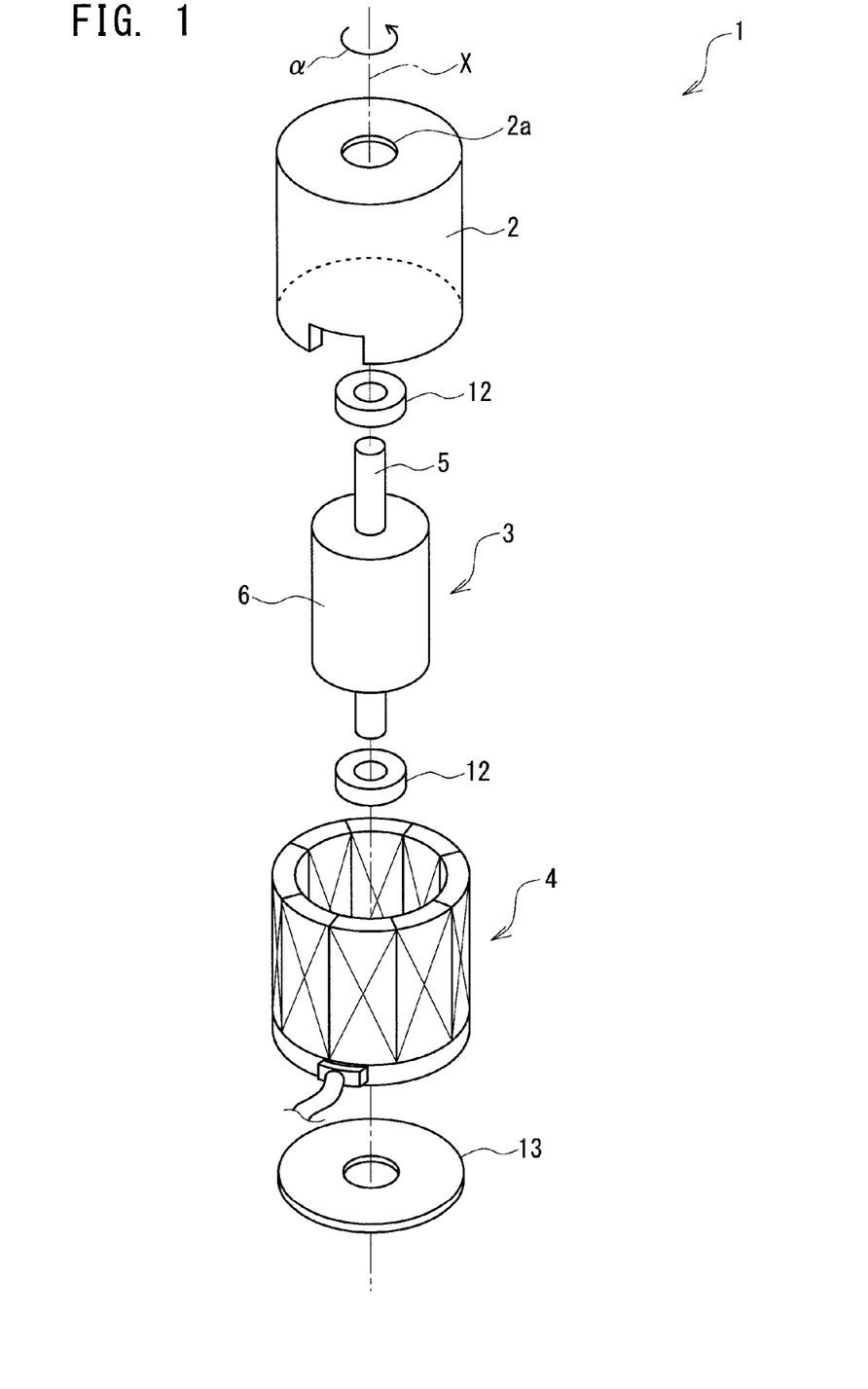
FIG. 1 shows an exploded perspective view of the motor related to Embodiment 1.

Hereinafter, a motor (electrical motor) 1 as a type of rotating electrical machine related to Embodiments is described with reference to the drawings. FIG. 1 is an exploded perspective view of the motor 1 related to Embodiments. The motor 1 is an inner rotor-type motor. Moreover, a permanent magnet is used in the rotor 3 as a magnetic field. The motor 1 includes a motor case 2, a rotor (rotator, inner rotor) 3, a bearing 12, and a stator (stator, outer stator) 4.

The motor case 2 is a casing configuring the outer wall of the motor 1 with a through hole 2a opening in the upper surface thereof. Inside the motor case 2, the rotor 3 is arranged as a field magnet. The rotor 3 includes a shaft 5 and a rotor core 6. Between the motor case 2 and the rotor 3, the bearing 12 is arranged. The rotor 3 includes a plurality of permanent magnets seriate arranged so as to be of alternately differing poles. The plurality of permanent magnets is circumferentially arranged along the circumferential surface of the rotor 3.

The shaft 5 penetrates the center hole of the bearing 12 and the through hole 2a of the motor case 2. The outer ring of the bearing 12 is connected to the motor case 2 and by means of the inner ring of the bearing 12 connected to the shaft 5 of the rotor 3, the entire rotor 3 is made rotatable in the α direction of the arrow in the figure, revolving around the central axis X of the shaft 5 with respect to the motor case 2. The central axis X of the shaft 5 is in the same position as the center of the circle of the outer core 7 to be mentioned later from a planar view. Accordingly, it is denoted by the same symbol X as the central axis of the center of the circle of the outer core 7 from a planar view.

The baring 12 can be configured to be sandwiched between the motor case 2 and the rotor 3 without connecting to the motor case 2 or the rotor 3. A bottom ring 13 covering the bottom surface of the motor case 2 is arranged below the rotor 3. The bearing 12 is also arranged between the rotor 3 and the bottom ring 13 such that it rotatable supports the rotor 3.

Moreover, in the present specifications, for convenience, the vertical direction in FIG. 1 is defined as the vertical direction in the motor 1, using names such as the upper surface, bottom surface, etc. However, needless to say, the vertical direction is not limited to the vertical direction in FIG. 1, depending on the manner in which the motor is used.

Figure 2:
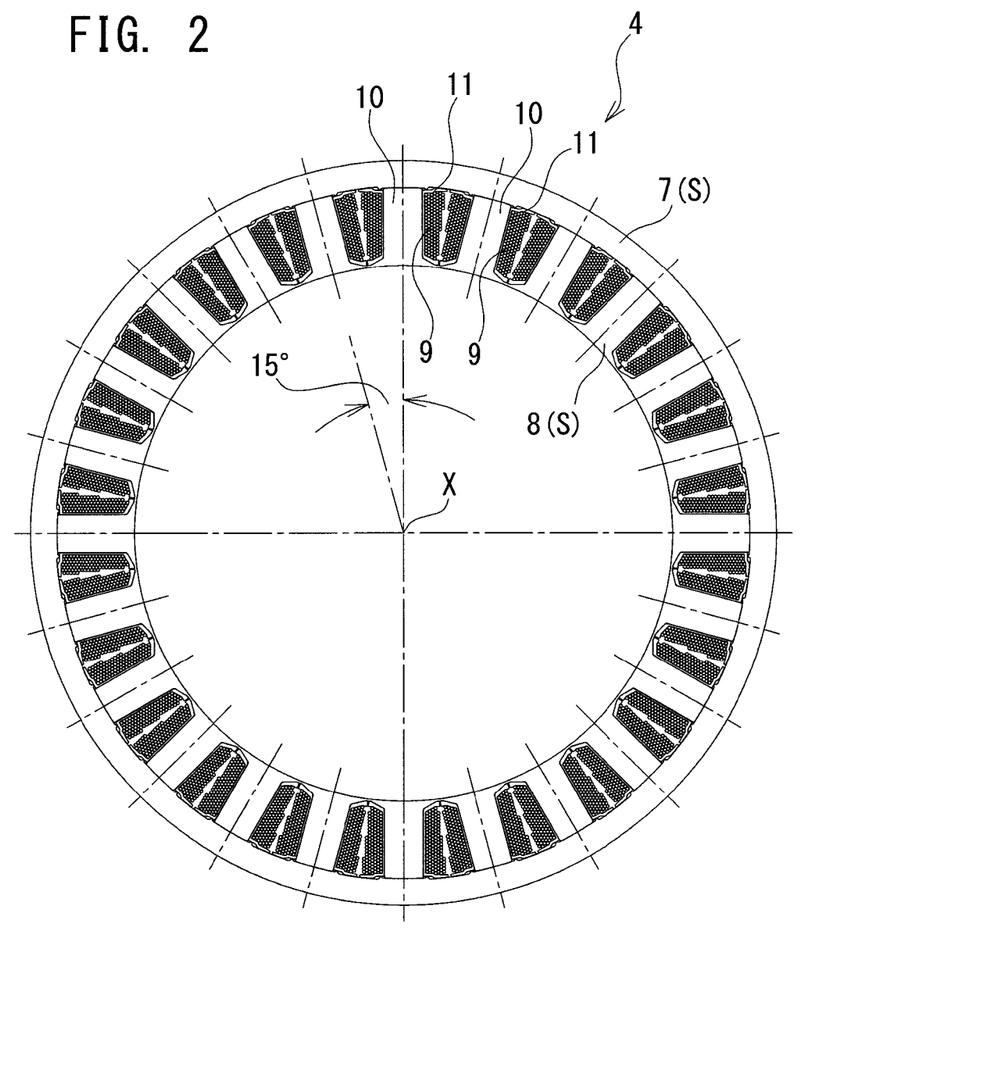
FIG. 2 shows a cross-section of the axial orthogonal plane of the stator shown in FIG. 1.

The stator 4 as an armature is arranged inside the motor case 2 so that it surrounds the rotor 3 from outside the rotor 3. FIG. 2 shows a cross-section of the axial orthogonal plane of the stator 4. The cross-section of the stator 4 in the axial orthogonal plane (the plane with a central axis X in the normal direction) is completely circular. The stator 4 includes a stator core S and a plurality of bobbins 11. The stator core S is composed of an outer core 7 and an inner core 8. A winding wire (coil) 9 is respectively wound around the plurality of bobbins 11 making up armature coils.

The outer core 7 is made of a metal annular member and maintains the outside of the inner core 8. The inner core 8 is made of a magnetic material and has a plurality of radically extending teeth 10. In addition, in the present embodiment, the outer core 7 and the inner core 8 are made of the same sheet metal material (magnetic metal) cut-out by a press and configured by laminating in the thickness direction. The teeth 10 are circumferentially arranged with equal gaps. Two adjacent teeth 10 are connected with each other at a root part (nearer side to the center of the circle X) and protrude outside from there. The inner core 8 is arranged in the circumference of the rotor 3 so as to ensure a specific magnetic gap with the permanent magnet of the rotor 3.

The winding wire 9 is wound so as to surround the teeth 10. Specifically, the winding wire 9 is wound around a cylindrical bobbin 11 and the bobbin 11 is inserted into the teeth 10. With this stator 4, twenty-four bobbins 11 are respectively inserted into twenty-four teeth 10 and circumferentially arranged. Accordingly, the angle gap between adjacent teeth 10 is 15°.

Each winding wire 9 is connected to an AC power supply corresponding to each two phases, three phases, or greater. When a current having a different phase flows in each phase, the rotor 3 rotates by electromagnetic induction. In this embodiment, every two adjacent winding wires 9 are connected to a three-phase, that is, a phase U, a phase V, and a phase W, AC power supply.

Figure 3:
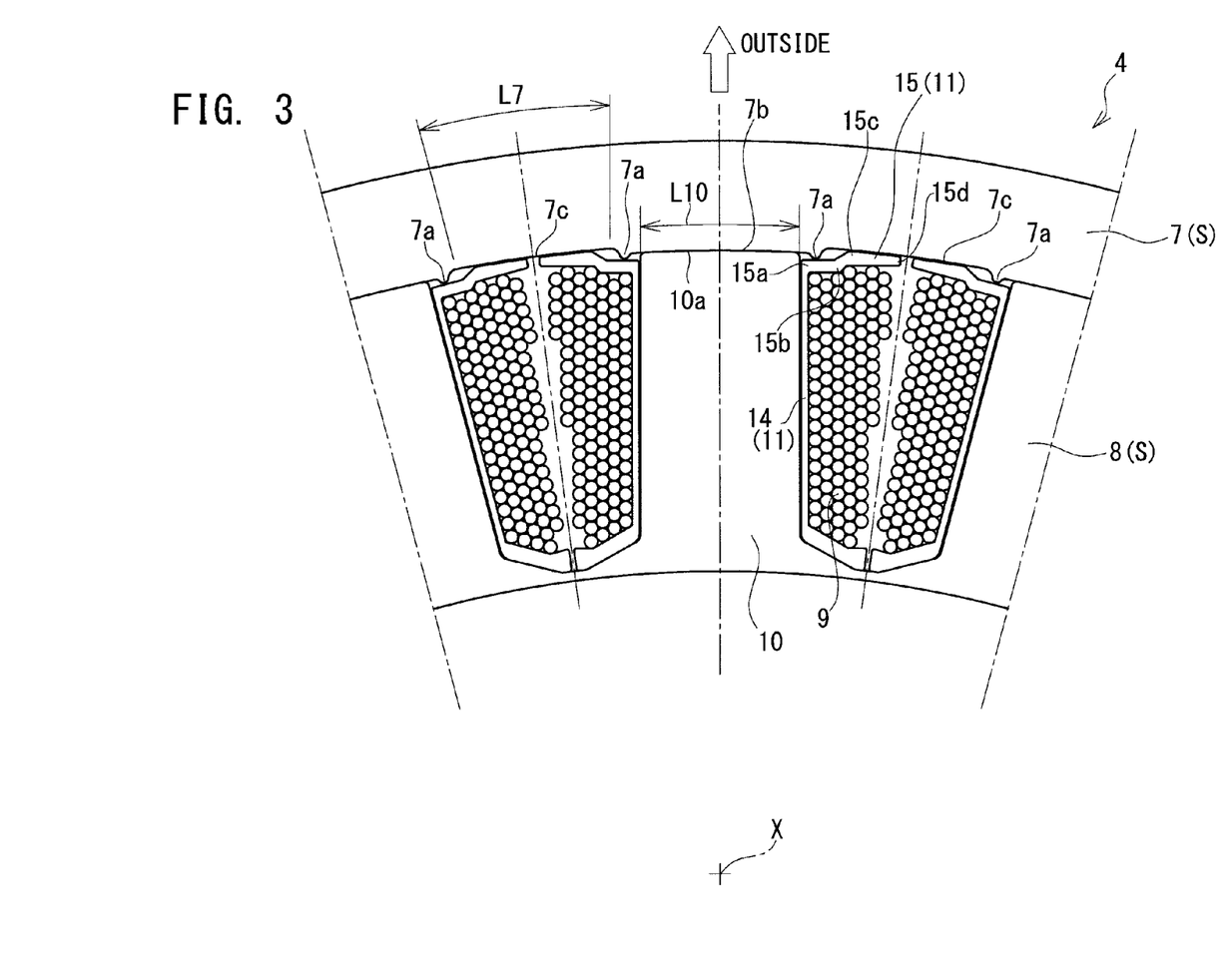
FIG. 3 shows a partial, cross-sectional view on a large scale of the stator shown in FIG. 2.

FIG. 3 shows a partial, cross-sectional view on a large scale of the stator 4. FIG. 3 is a cross-section in the axial orthogonal plane in the vicinity of the teeth 10 and shows a state in which the bobbins 11 are inserted into the teeth 10. The winding wires 9 are wound around the bobbins 11 and the bobbins 11 are inserted into the teeth 10 from outside. Upon insertion of the bobbin 11, the inner core 8 is inserted into the outer core 7 by shrink-fitting so that the inner core 8 is arranged inside the outer core 7.

On the inner periphery of the outer core 7, an abutment surface 7b is formed. The abutment surface 7b is the face on which the tip (outside end part) 10a of the teeth 10 of the inner core 8 abuts. On both sides of the abutment surface 7b in the circumferential direction, projections 7a are formed. The projections 7a project to the inner periphery side of the abutment surface 7b and are located on both sides of the teeth 10. The projections 7a are located between a first bent part 15a and a second bent part 15b of the bobbin 11 inserted into the teeth 10. The projections 7a restrict relative rotation in the circumferential direction of the outer core 7 and the inner core 8.

On the inner periphery of the outer core 7, an evacuation surface 7c is formed. The evacuation surface 7c is located on the opposite side of the abutment surface 7b when viewed from the projection 7a. The evacuation surface 7c is located outside (far side from the center of the circle X) the abutment surface 7b in the radial direction of the outer core 7. As the evacuation surface 7c is evacuated outside the radial direction, interference between the evacuation surface 7c and a flange part 15 (specifically, a third bent part 15c and an edge part 15d) of the bobbin 11 is prevented. The bobbin 11 and winding wire 9 are located in the space surrounded by the evacuation surface 7c and side surface of the teeth 10.

As we shall discuss later, in the present embodiment, the outer core 7 and the inner core 8 are made of the same material by a press. During the pressing process, the tip 10a of the teeth 10 opposes the evacuation surface 7c. Accordingly, the evacuation surface 7c is located outside (far side from the center of the circle X) the tip 10a in the radial direction of the outer core 7. The length (L7) along the circumferential direction of the evacuation surface 7c is longer than L10, which is the width (that is, the length along the circumferential direction of the tip 10a) of the teeth 10 in the circumferential direction.

The bobbin 11 is totally formed of a square cylindrical shape or a cylindrical shape and is formed by resin molding. The hollow interior of the bobbin 11 is adapted to be inserted by the teeth 10. In FIG. 3, the bobbin is cut in the axial orthogonal plane that crosses near the center of the bobbin 11. The bobbin 11 includes a cylindrical body part 14 and a flange part 15. The cylindrical body part 14 makes up the body part of the bobbin 11 and is the part around which the winding wire 9 is wound. The teeth 10 penetrate the hollow interior of the cylindrical body part 14.

The flange part 15 is located outside the cylindrical body part 14 and formed so as to rise from the cylindrical body part 14. The flange part 15 supports the side of the winding wire 9 to prevent the winding wire 9 in a lamination state from collapsing. The flange part 15 includes a plurality of (three in the present embodiment) bent parts 15a to 15c and an edge part (free end part) 15d.

The first bent part 15a is formed between the cylindrical body part 14 and the flange part 15. That is, the part connecting the cylindrical body part 14 with the flange part 15 is the first bent part 15a. In the first bent part 15a, the cylindrical body part 14 and the flange part 15 are bent at almost 90° and the flange part 15 extends along almost the circumferential direction of the outer core 7. The first bent part 15a is bent in the direction in which the flange part 15 moves away from the teeth 10 into which the cylindrical body part 14 is inserted.

The second bent part 15b is formed on the edge part 15d side, which is closer to the tip (end part) of the flange part 15 than the first bent part 15a. The second bent part 15b is bent so as to direct the flange part 15 that is closer to the edge part 15d side to the outer periphery side (that is, the direction moving away from the center of the circle X), namely, bent toward the outer core 7. The bent direction is opposite to the first bent part 15a. As the second bent part 15b is bent so as to direct the flange part 15 to the outer periphery side, thereby increasing the winding space of the bobbin 11. Accordingly, much more winding wires 9 can be wound around the bobbin 11.

The projection 7a of the outer core 7 is located between the first bent part 15a and the second bent part 15b and opposes the flange part 15 of the bobbin 11. That is, the flange part 15 avoids interference with the projection 7a by being bent at the first bent part 15a. And the flange part 15 increases the winding space by being bent at the second bent part 15b.

The third bent part 15c is formed on the edge part 15d side, which is closer to the tip (end part) of the flange part 15 than the second bent part 15b. The third bent part 15c is bent so as to direct the flange part 15 that is closer to the edge part 15d side to the direction along the circumferential direction, that is, bent toward the direction along the inner circumference of the outer core 7. The bent direction is opposite the second bent part 15b. As the third bent part 15c is bent so as to direct the flange part 15 along the circumferential direction, not only is the effect of increasing the winding wire space by the second bent part 15b obtained but also a small size bobbin 11. Since the bobbin 11 is prevented from growing in size in the radial direction of the stator 4, downsizing of the stator 4 in the radial direction is enhanced.

In the bobbin 11, the thickness of the flange part 15 is totally made so that it is almost homogeneous. That is, the thickness in the first bent part 15a, the second bent part 15b, and the third bent part 15c, and the thickness between the first bent part 15a and the second bent part 15b, between second bent part 15b and the third bent part 15c, and between the third bent part 15c and the edge part 15d are almost constant. Accordingly, the bent shape of the face opposing the outer core 7 side of the flange part 15 and the bent shape opposing the winding wire 9 sides are almost the same. By making the thickness constant, the bobbin 11 can be preferably formed. By forming the first bent part 15a, the second bent part 15b, and the third bent part 15c at an almost constant thickness, the winding wire space is increased and downsizing of the whole bobbin 11 is achieved while preventing interference with the projection 7a.

<Pressing of the Outer Core and the Inner Core>

Figure 4:
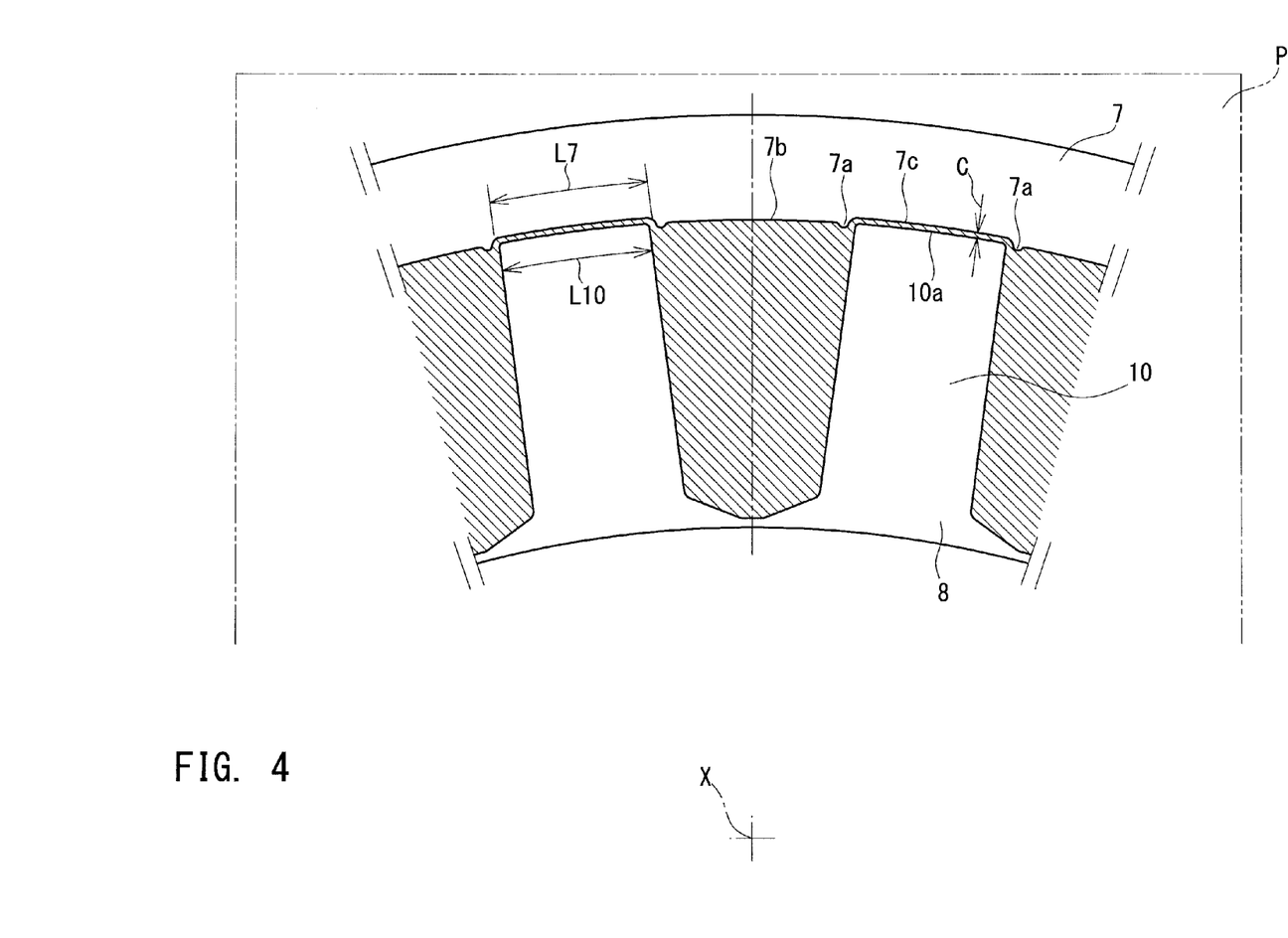
FIG. 4 shows an illustrative drawing illustrating the positional relation between the outer core and the inner core when both of them are pressed from the same sheet metal material.

FIG. 4 shows an illustrative drawing illustrating the positional relation between the outer core 7 and the inner core 8 when both are pressed from the same sheet metal material P. Hatching parts in FIG. 4 show parts being removed by being cut out of a press. When pressing from the sheet metal material P, the teeth 10 of the inner core 8 and the evacuation surface 7c of the outer core 7 are arranged such that they oppose each other. That is, the positional relation between the outer core 7 and the inner core 8 in the stator 4 and the positional relation between the outer core 7 and the inner core 8 when pressing from the sheet metal material P are shifted by 7.5° with the center of the circle X as the rotation center.

When cutting out the outer core 7 and inner core 8 from the sheet metal material P by pressing, a pressing allowance C of a certain width or wider is needed. The length of the pressing allowance C is corresponding to the thickness of a press die as a pressing blade. In the same way as the positional relation between the outer core 7 and the inner core 8 in the stator 4, when pressing the both cores 7 and 8 from the sheet metal material P with the teeth 10 and the abutment surface 7b opposed, the length of the teeth 10 becomes shorter by the length of the pressing allowance C. Consequently, the teeth 10 cannot abut with the abutment surface 7b by shrink-fitting.

By opposing the evacuation surface 7c with the teeth 10 to perform pressing, it is possible to nearly coincide the position of a tip 10a of the teeth 10 in the radial direction with the position of the abutment surface 7b in the radial direction even when there is a pressing allowance C. The position of the evacuation surface 7c in the radial direction moves away from the center of the circle X from the tip 10a of the teeth 10 by at least the length of the pressing allowance C. A length of a circumferential direction L10 of the tip 10a of the teeth 10 is equal to or less than the length of a circumferential direction L7 of the evacuation surface 7c interposed by two projections 7a of the outer core 7.

<Conventional Stator>

Figure 5:
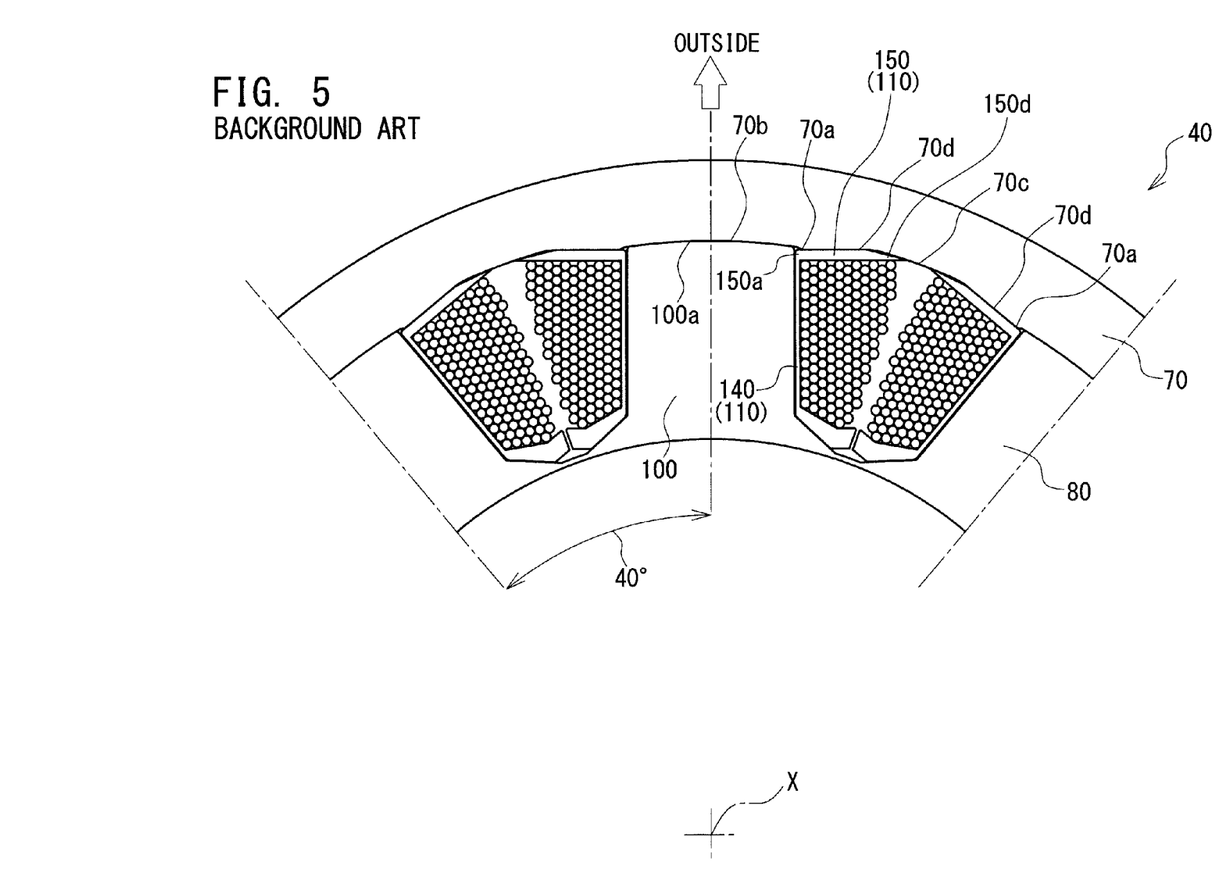
FIG. 5 shows a partial, cross-sectional view on a large scale of a conventional stator in the axial orthogonal plane.

FIG. 5 shows a partial, cross-sectional view on a large scale of a conventional stator 40 in the axial orthogonal plane. With this stator 40, the number of teeth 100 (the number of slots) is nine. Accordingly, the angle gap of two adjacent teeth 100 is 40°.

On the inner periphery of an outer core 70, an abutment surface 70b is formed. On both sides of the abutment surface 70b, a projection 70a is arranged. On the opposite side of the abutment surface 70b when viewed from the projection 70a, an evacuation surface 70c is formed extending along almost the circumferential direction. The evacuation surface 70c is located farther from the center of the circle X than the location of the abutment surface 70b. The projection 70a and the evacuation surface 70c are connected by a smoothly inclining inclined surface 70d.

A bobbin 110 is inserted into the teeth 100. The bobbin 110 includes a first bent part 150a in the part connecting a cylindrical body part 140 and a flange part 150. The flange part 150 includes neither a second bent part nor a third bent part. From the first bent part 150a to an edge part 150d, the flange part is adapted to be almost linear along the inclined surface 70d of the outer core 70.

Figure 6:
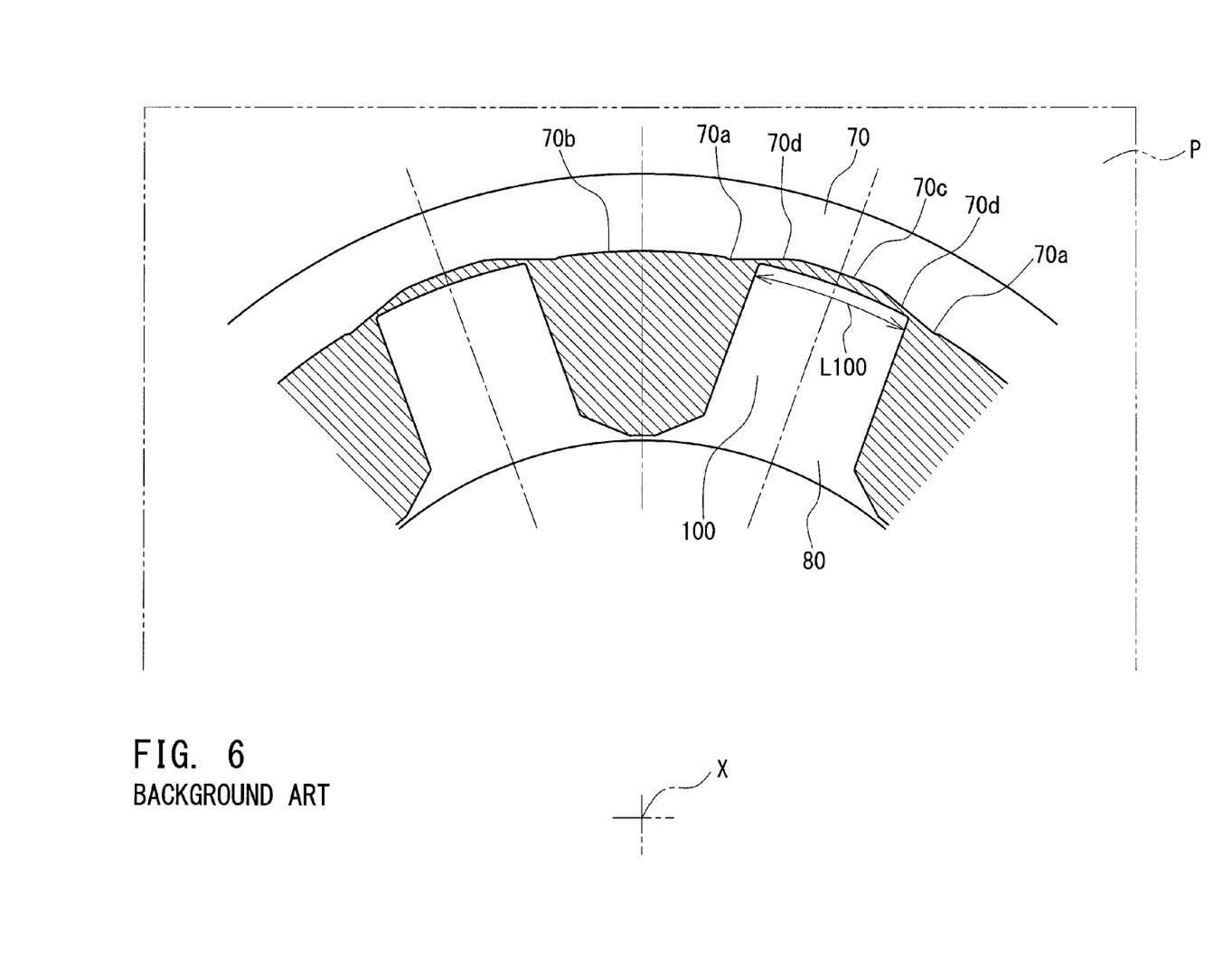
FIG. 6 shows an illustrative drawing illustrating the positional relation between a conventional outer core and inner core when both of them are pressed from the same sheet metal material.

FIG. 6 shows an illustrative drawing illustrating a positional relation between the conventional outer core 70 and a conventional inner core 80 when both are pressed from the same sheet metal material P. Hatching parts in FIG. 6 show parts being removed by being cut out of a press. When pressing from the sheet metal material P, the teeth 100 of the inner core 80 and the evacuation surface 70c of the outer core 70 are arranged such that they oppose each other. That is, the positional relation between the outer core 70 and the inner core 80 in a stator 40 and the positional relation between the outer core 70 and the inner core 80 when pressing from the sheet metal material P are shifted by 20° with the center of the circle X as the rotation center.

With the conventional stator 40, the angle of the gap between each tooth 100 is 40°, which is relatively large. As a result, even when the projection 70a and the evacuation surface 70c are connected with the inclined surface 70d, the length of the evacuation surface 70c in the circumferential direction can be relatively long. The width in the circumferential direction of the teeth 100 is almost the same as the length of the abutment surface 70b in the circumferential direction. The position of the tip 100a of the teeth 100 in the radial direction is almost the same as the position of the abutment surface 70b in the radial direction. Taking the pressing allowance of a press die into consideration, a width L100 of the teeth 100 in the circumferential direction is the circumferential length connecting an intermediate portion (the intermediate portion corresponds to the position of the abutment surface 70b in the radial direction) of two inclined surfaces 70d each other.

When the number of slots is increased, the length in the circumferential direction of the evacuation surface 70c needs to be shortened when the inclination angle of the inclined surface 70d is constant. Consequently, the width L100 of the teeth 100 in the circumferential direction cannot be ensured to be the same as the length of the abutment surface 70b in the circumferential direction.

However, the stator 4 of the present embodiment solves the above problem. That is, the outer core 7 is configured such that the evacuation surface 7c is located just after the projection 7a. As a result, a state is obtained in which no inclined surface is available or the inclination angle of the inclined surface is steep. Consequently, the long length of the evacuation surface 7c in the circumferential direction can be ensured. Even when the stator 4 has a number of slots, the width L10 of the teeth 10 in the circumferential direction can be kept almost the same as the length L7 of the abutment surface 7b in the circumferential direction.

By configuring the bobbin 11 so as to locate the first bent part 15a and the second bent part 15b on both sides of the projection 7a and further to locate the third bent part 15c between the second bent part 15b and the edge part 15d, the winding wire space can be increased to contribute to the improvement in property of the motor 1.

As above, the embodiment of the present invention was described; however, the present invention is not limited to this and various arrangements and modifications are possible within the range of the summary thereof.

In the abovementioned embodiments, the rotating electrical machine has been described as a motor (electrical motor) 1; however, the rotating electrical machine may be a generator including the rotor 3 and the stator 4 with the same configuration as the motor 1. In addition, descriptions are provided assuming that the number of slots (that is, the number of teeth 10) of the stator 4 is assumed to be twenty four; however, the number of slots is not limited to this and other numbers may be appropriately set. The motor is not limited to an outer stator (inner rotor) type as described in the embodiment. Alternatively, an inner stator (outer rotor) type motor is applicable.

The inner core radially protrudes from the center of the circle of the outer core toward the outside with an equal gap and has teeth whose outer edge part is abutting the inner periphery of the outer core. A cylindrical body part is inserted into the teeth such that a flange part becomes outward. A plurality of bent parts includes a first bent part formed between the cylindrical body part and flange part and a second bent part formed closer to a free end part side than the first bent part. On an inner periphery of the outer core, a projection is formed that protrudes inside. The projection may be on both sides of the outside edge part of the teeth and located between the first bent part and the second bent part of a bobbin.

The second bent part may be bent towards the outer core.

The thickness of the bobbin in the second bent part may be nearly the same as the thickness of the bobbin in the first bent part.

The third bent part may be formed closer to the free end side than the second bent part in the flange part.

The bent direction of the third bent part may be opposite the bent direction of the second bent part.

The thickness of the bobbin in the third bent part may be nearly the same as the thickness of the bobbin in the first bent part.

The bobbin may be located further side from the center of the circle of the outer core than the outside edge part of the teeth on the free end part side of the third bent part.

As another exemplary aspect of the present invention, the rotating electrical machine includes the above stator and a rotor that is disposed outside of the outer core or inside of the inner core and is rotatable about the center of the circle.

Obviously, numerous modifications and variations of the present invention are possible in light of the above teachings. It is therefore to be understood that within the scope of the appended claims, the invention may be practiced otherwise than as specifically described herein.

What is claimed is:

1. A stator, comprising:
a stator core having an almost annular outer core and an inner core arranged inside of the outer core, and
a bobbin having a cylindrical body part around which a winding wire is wound and a flange part that is formed so as to rise up from the cylindrical body part, with a plurality of bent parts and free end parts, wherein
the inner core radially protrudes towards the outside with an equal gap when viewed from the center of a circle of the outer core and has teeth with an outer edge part abutting the inner periphery of the outer core,
the cylindrical body part is inserted into the teeth such that the flange part becomes outward,
the plurality of bent parts includes a first bent part formed between the cylindrical body part and the flange part and a second bent part formed closer to a free end part side than the first bent part,
on the inner periphery of the outer core, a projection is formed protruding inside, with the projection on both sides of an outside edge part of the teeth and located between the first bent part and second bent part of the bobbin.

2. The stator according to claim 1, wherein
the second bent part is bent towards the outer core.

3. The stator according to claim 1, wherein
the thickness of the bobbin in the second bent part is almost the same as the thickness of the bobbin in the first bent part.

4. The stator according to claim 1, wherein
a third bent part is formed closer to the free end side than the second bent part in the flange part.

5. The stator according to claim 4, wherein
the thickness of the bobbin in the third bent part is almost the same as the thickness of the bobbin in the first bent part.

6. The stator according to claim 5, wherein
the free end part side of the third bent part of the bobbin is located further from a central axis of the outer core than the outside edge part of the teeth.

7. The stator according to claim 4, wherein
the free end part side of the third bent part of the bobbin is located further from a central axis of the outer core than the outside edge part of the teeth.

8. The stator according to claim 4, wherein
the bent direction of the third bent part is opposite the bent direction of the second bent part.

9. The stator according to claim 8, wherein
the thickness of the bobbin in the third bent part is almost the same as the thickness of the bobbin in the first bent part.

10. The stator according to claim 9, wherein
the bobbin is located on the further side from the center of a circle of the outer core than the outside edge part of the teeth on the free end part side of the third bent part.

11. The stator according to claim 8, wherein
the bobbin is located on the further side from the center of a circle of the outer core than the outside edge part of the teeth on the free end part side of the third bent part.

12. A rotating electrical machine, comprising:
the stator according to claim 4, and
a rotor that is arranged outside the outer core or inside the inner core and is rotatable about the center of the circle.

13. The rotating electrical machine according to claim 12, wherein
the rotating electrical machine is a motor.

14. The rotating electrical machine according to claim 12, wherein
the rotating electrical machine is a generator.

15. A rotating electrical machine, comprising:
the stator according to claim 1, and
a rotor that is arranged outside the outer core or inside the inner core and is rotatable about the center of the circle.

16. The rotating electrical machine according to claim 15, wherein
the rotating electrical machine is a motor.

17. The rotating electrical machine according to claim 15, wherein
the rotating electrical machine is a generator.

* * * * *